Figure 1:
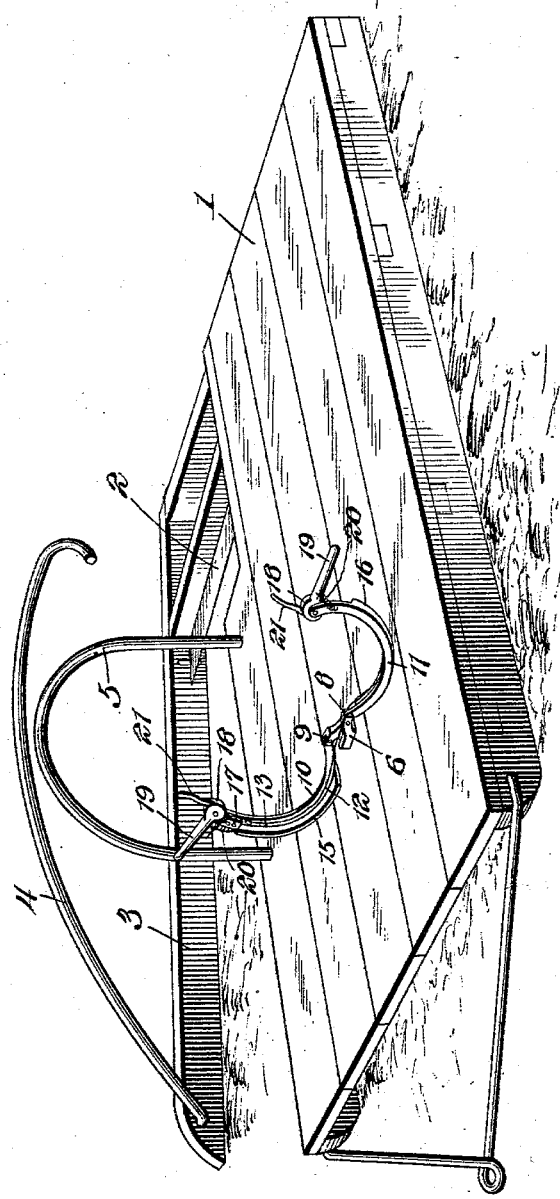

No. 748,782. PATENTED JAN. 5, 1904.
J. C. PARKER.
HARVESTER.
APPLICATION FILED NOV. 20, 1902.
NO MODEL. 2 SHEETS—SHEET 1.

Witnesses
Howard D. Orr
Louis J. Julihn

James C. Parker, Inventor,
By E. G. Siggers,
Attorney

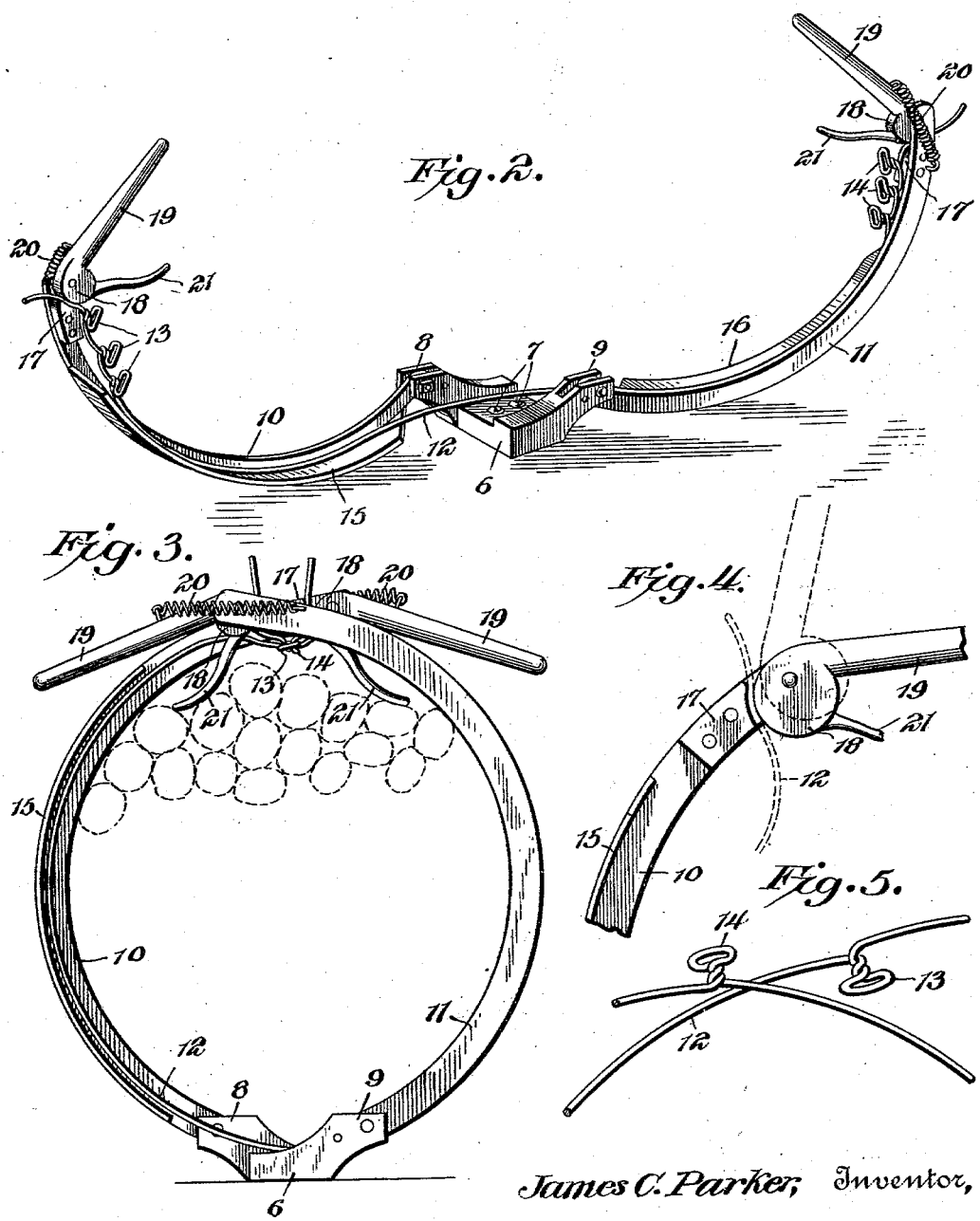

No. 748,782. Patented January 5, 1904.

UNITED STATES PATENT OFFICE.

JAMES C. PARKER, OF WOODSTON, KANSAS.

HARVESTER.

SPECIFICATION forming part of Letters Patent No. 748,782, dated January 5, 1904.

Application filed November 20, 1902. Serial No. 132,153. (No model.)

*To all whom it may concern:*

Be it known that I, JAMES C. PARKER, a citizen of the United States, residing at Woodston, in the county of Rooks and State of Kansas, have invented a new and useful Harvester, of which the following is a specification.

This invention relates to corn or fodder harvesters, and more particularly to a novel sheaf former and binder therefor.

It is usual in this art to harvest corn by means of a harvester including a platform upon which the harvested corn falls as it is cut. The object of my invention is to equip this platform with a simple and inexpensive sheaf forming and binding device disposed to receive the corn and designed to be manually operated to bunch the same, and thereby form a sheaf, and to simultaneously apply to the sheaf a tie or binder which will be automatically secured as an incident to the forming of the sheaf. Subordinate to this general object are others, which will appear during the following description of the preferred embodiment of the invention.

In the accompanying drawings, Figure 1 is a perspective view of a harvesting-sled equipped with my invention. Fig. 2 is a perspective view of the sheaf former and binder in its open or spread position and showing the tie in place. Fig. 3 is an elevation of the device shown in Fig. 2 with the parts in the positions they assume when the sheaf is completely formed and bound. Fig. 4 is a detail view of a portion of the device, showing the manner in which the tie is clamped by the handles of the former; and Fig. 5 is a detail view of a portion of a tie, showing the manner in which the catches thereof are related.

Like numerals of reference are employed to designate corresponding parts throughout the several views.

1 indicates the platform of a corn-sled provided, as usual, with a knife or cutter 2, a gathering-bar 3, spaced from one side of the sled, a reel-hook 4, extending rearwardly and inwardly from the front end of the bar 3, and a vertical arch 5, upstanding from the side of the sled adjacent to the bar 3 and designed to assist in guiding the cornstalks reeled onto the platform 1 by the hook 4 as the stalks are severed by the knife 2 during the progress of the sled across the field. The corn-sled as thus constructed is not novel and is illustrated for the sole purpose of disclosing the receiving-platform of a harvester equipped with my invention. It should be distinctly understood that the latter is adapted for use in connection with a harvester of any character, provided it is equipped with a platform or other support capable of sustaining my sheaf forming and binding device in position to receive the corn or other cereal as it is harvested.

Upon the platform 1 is disposed transversely at a point somewhat in advance of the knife the sheaf forming and binding device contemplated by my invention. This device includes a base-block 6, secured to the platform 1, as by screws 7 or other suitable retaining devices, and formed with oppositely-extending pairs of ears 8 and 9, between which are pivotally mounted the inner or lower ends of a pair of arcuate bunching or sheaf-forming members 10 and 11. The members 10 and 11 normally rest upon the platform in position to receive the corn or other cereal reeled onto the platform by the reeling-hook 4, and when the harvested material has been accumulated in sufficient quantity these members are designed to be swung up to the position indicated in Fig. 3 to form a closely-packed sheaf. As shown in Fig. 2, the sheaf-forming members 10 and 11 are disposed out of alinement, so that when swung up to form a sheaf their upper ends will move past each other in order to effect the locking of the ends of a tie 12, held by the sheaf-forming device and carried around a sheaf simultaneously with the forming of the latter.

The specific character of the tie 12 constitutes no part of my present invention; but for the purpose of this disclosure I have shown in the drawings a tie having the form of a strand of wire provided adjacent to its ends with oppositely-disposed catches 13 and 14, certain of which will be brought together in interlocking relation as the upper ends of the sheaf-forming members 10 and 11 move past each other to the position shown in Fig. 3. The tie extends from one end to the other of the forming device and is supported in proper relation to the members 10 and 11 by flanges 15 and 16, extending laterally in opposite directions from the lower or outer edges of the members. Since the members are disposed out of alinement, these oppositely-disposed flanges 15 and 16 will be substantially alined to support the tie, the extremities of which are clamped against seats 17 and securely retained by cams 18, formed at the inner ends of the operating-handles 19, pivoted at the extremities of the members 10 and 11.

It will be evident by reference to Fig. 4 that when the handles are moved to one position the cams 18 will grip the ends of the tie and when moved in the opposite direction will cause the release of the tie, so that the members may be thrown back to their initial positions to permit the removal of the bound sheaf from the device. The retention of the operating-handles in either their holding or releasing positions is effected by means of springs 20. Each of these springs is secured at one end to a member of the sheaf-former below the axis of the handle secured thereto and is attached at its opposite or upper end to the handle at a point above the axis, as clearly shown in Fig. 2. It will therefore appear that when the handle is thrown to one position to clamp the tie it will be held by the spring, and when thrown to the opposite position to release the tie the spring will be equally effective to retain it by reason of the fact that as the handle is thrown the spring will move to one side or the other of the axis thereof, and will thereby serve equally well as a retaining device for the handle in either position of the latter.

To prevent the corn from obstructing the tie during the crossing of the ends of the latter necessary to interlock the catches, the handles are provided with guard-fingers 21, preferably extending from the lower or cam ends thereof and arranged to bear upon and depress the upper portion of the sheaf when the members 10 and 11 are swung up to encircle the corn. At this point it may be well to call attention to the fact that the flanges 15 and 16 terminate at a considerable distance from the upper ends of the forming members to prevent interference with the interlocking of the catches 13 and 14 of the tie.

Briefly the operation of the device is as follows: The parts being in the positions shown in Fig. 1, the harvester is drawn over the field in the usual manner and the knife or cutter 2 is presented to a row of corn received between the gathering-bar 3 and the adjacent side of the harvester. As the harvester advances the corn will be cut and will be reeled over onto the platform 1 by the reeling-hook 4. As the corn is delivered to the platform it will drop into the sheaf-forming device and will be permitted to accumulate. When the accumulation is sufficient, the operator will grasp the handles 19 and by a single movement will swing them around to grip the tie previously placed in the device and will elevate the forming members to the positions shown in Fig. 3. The members thus manipulated will bunch the corn to form a sheaf and will at the same time encircle the sheaf with a tie or binder the ends of which will be presented in crossing relation. This crossing of the ends of the tie is facilitated by the guard-fingers or depressors 21, which keep the corn from interfering with the meeting ends of the tie. Having formed the sheaf and encircled it with the tie, the operator will swing back the handles to release the tie, this operation being assisted by the pressure exerted upon the guard-fingers by the expanding sheaf. As soon as the ends of the tie have been released they will be drawn back by the expansion of the sheaf and the catches 13 and 14 will be drawn into interlocking engagement. The sheaf will thus be securely bound and the members will be permitted to drop back to their initial positions, leaving a bound sheaf ready for removal from the machine.

It is thought that from the foregoing the construction and operation of my harvester will be readily apparent; but while the illustrated embodiment of the invention is believed at this time to be preferable I do not wish to limit myself to the structural details defined, as, on the contrary, I reserve the right to effect such changes, modifications, and variations of the illustrated structure as may be fairly embraced within the scope of the protection prayed.

What I claim is—

1. A sheaf forming and binding device, comprising relatively movable forming members provided with independently-movable operating-handles and tie-retaining clamps operated by the handles to engage or release the tie.

2. A sheaf forming and binding device, comprising a pair of swinging arcuate forming members provided with tie-retaining clamps and with operating-handles movable independently of the members to operate the clamps for the purpose of engaging or releasing the tie.

3. A sheaf forming and binding device, comprising a pair of swinging arcuate forming members provided with seats and with operating-handles movable independently of the members, said handles having cam ends opposed to the seats to clamp the ends of a tie.

4. A sheaf forming and binding device, comprising a pair of swinging arcuate forming members having tie-retaining means, and means for depressing the upper portion of a sheaf confined between the forming members to prevent interference with the binding operation.

5. A sheaf forming and binding device, comprising a pair of swinging arcuate forming members provided with tie-retaining clamps at their upper ends and with depressing-fingers.

6. A sheaf forming and binding device, comprising a pair of swinging arcuate forming members provided with tie-retaining means, operating-handles and depressing-fingers.

7. A sheaf forming and binding device, comprising a pair of swinging arcuate forming members each of which is provided with an operating-handle, a tie-retaining clamp operated by the handle and a depressing-finger extending inwardly from the handle.

8. A sheaf forming and binding device, comprising a pair of swinging arcuate forming members each having a pivoted operating-handle at its upper end, a tie-clamping cam associated with the handle, and a spring for retaining the handle in one position.

9. A sheaf forming and binding device, comprising a pair of swinging arcuate forming members having lateral flanges for the support of a tie.

10. A sheaf forming and binding device, comprising a pair of swinging arcuate forming members having tie-supporting flanges, seats for the extremities of the tie, and operating-handles formed with cam ends arranged to clamp the extremities of the tie against the seats.

11. A sheaf forming and binding device, comprising a pair of swinging arcuate forming members each provided with terminal tie-retaining means, and movable to present their upper retained ends past each other for the purpose of bringing the ends of a tie together.

12. A sheaf forming and binding device, comprising a base, a pair of arcuate forming members hinged thereto and provided with oppositely-disposed tie-supporting flanges, seats for the extremities of the tie, operating-handles formed with cam ends arranged to clamp the extremities of the tie against the seats and springs for retaining the handles.

13. A sheaf forming and binding device, comprising a pair of arcuate forming members, provided at their upper ends with means for the retention of the extremities of a tie, said members being movable in parallel planes to present their upper ends in crossing relation for the purpose of bringing together the end portions of a tie.

In testimony that I claim the foregoing as my own I have hereto affixed my signature in the presence of two witnesses.

JAMES C. PARKER.

Witnesses:
R. EASTMAN,
JOHN FREINCISCO.